(12) United States Patent
Taiji et al.

(10) Patent No.: US 7,229,570 B2
(45) Date of Patent: Jun. 12, 2007

(54) SLURRY FOR CHEMICAL MECHANICAL POLISHING

(75) Inventors: Toshiji Taiji, Kanagawa (JP); Yasuaki Tsuchiya, Kanagawa (JP); Tomoyuki Ito, Tokyo (JP); Kenichi Aoyagi, Tokyo (JP); Shin Sakurai, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 235 days.

(21) Appl. No.: 10/616,914

(22) Filed: Jul. 11, 2003

(65) Prior Publication Data

US 2004/0021125 A1 Feb. 5, 2004

(30) Foreign Application Priority Data

Aug. 2, 2002 (JP) ............................. 2002-226103

(51) Int. Cl.
*C09K 13/00* (2006.01)
*C09K 13/06* (2006.01)
*H01L 21/302* (2006.01)

(52) U.S. Cl. ..................... 252/79.1; 252/79.4; 438/692

(58) Field of Classification Search ............... 252/79.1, 252/79.4; 438/692
See application file for complete search history.

(56) References Cited

U.S. PATENT DOCUMENTS 6,194,317 B1 * 2/2001 Kaisaki et al. .............. 438/692
6,207,630 B1 * 3/2001 Vaartstra ..................... 510/175
6,313,039 B1 * 11/2001 Small et al. ................. 438/693
6,447,563 B1 * 9/2002 Mahulikar ................... 51/309

FOREIGN PATENT DOCUMENTS

| JP | 7-233485 | 9/1995 |
|---|---|---|
| JP | 8-83780 | 3/1996 |
| JP | 10-116804 | 5/1998 |
| JP | 11-238709 | 8/1999 |
| JP | 2000-133621 | 5/2000 |
| JP | 2001-187876 | 7/2001 |
| JP | 2001-187878 | 7/2001 |
| JP | 2001-189296 | 7/2001 |
| JP | 2002-164308 | 6/2002 |
| JP | 2002-164309 | 6/2002 |
| JP | 2002-164310 | 6/2002 |
| KR | 2001-20384 | 3/2001 |
| WO | WO 98/49723 | 11/1998 |

* cited by examiner

*Primary Examiner*—Nadine G. Norton
*Assistant Examiner*—Lynette T. Umez-Eronini
(74) *Attorney, Agent, or Firm*—Young & Thompson

(57) ABSTRACT

The present invention relates to a slurry for chemical mechanical polishing, which contains a silica polishing material, an oxidizing agent, a benzotriazole-based compound, a diketone and water.

8 Claims, No Drawings

SLURRY FOR CHEMICAL MECHANICAL POLISHING

BACKGROUND OF THE INVENTION

1. Field of the Invention

The present invention relates to a slurry for chemical mechanical polishing and more particularly a polishing slurry that is well suited to a chemical mechanical polishing performed in the step of forming a copper-based metal interconnection of a semiconductor device.

2. Description of the Related Art

In the formation of a semiconductor integrated circuit such as an ULSI, for which the progress to attain further miniaturization and more densely spaced arrangement has been currently gathering more speed, copper is a particularly useful material for electrical connection to obtain the interconnection of good performance and high reliability, because of its considerably low electrical resistance and high resistance against the electromigration and the stress migration.

Since it is difficult to work copper into shape by means of dry etching, a copper interconnection is formed by so-called damascene method, for instance, in the following way.

Firstly, a sunken section such as a trench or a connection hole is formed in an insulating film formed on a silicon substrate. Next, after a barrier metal film is formed on the surface inclusive of the inside of this sunken section, a copper film is grown by the plating method so as to fill up this sunken section. Polishing is then carried out by the chemical mechanical polishing (referred to as "CMP" hereinafter) method until the surface of the insulating film other than the sunken section is completely exposed, so that the surface may be planarized. Thereby, the formation of an electrical connection section such as a buried copper interconnection, a via plug or a contact plug, in which copper is laid to fill up the sunken section, with a barrier metal film being interposed therebetween, is accomplished.

When a buried-type electrical connection section is formed, a barrier metal film is generally formed, as described above, for the purpose of preventing the copper-based metal from diffusing into the insulating film and improving the adhesion between the copper-based metal and the substrate (the insulating film). For the barrier metal film against copper-based metal, tantalum-based metal such as Ta or TaN is favourably used.

To conduct the polishing of a copper-based metal film overlying such a barrier metal film, it is necessary to take the differences in polishing rate between the copper-based metal film and the barrier metal film and that and the insulating film into consideration.

Now, from necessity of filling up the sunken section of the insulating film, the copper-based metal film must be formed thickly. In order to polish and remove such a thick copper-based metal film efficiently, a polishing slurry capable to make the rapid polishing of the copper-based metal film is normally utilized. However, when such a polishing slurry is used for the barrier metal film made of a different material, the polishing rate for this film generally becomes rather low. Therefore, if the barrier metal film is made to be polished and removed thoroughly, even the copper-based metal laid within the sunken section may be excessively removed to create dishing. The phenomenon of this sort is particularly notable when the tantalum-based metal is utilized for the barrier metal film.

Accordingly, in order to prevent dishing of this sort from occurring, there has been proposed the two-steps polishing method which comprises the step of a first polishing wherein mainly a thick copper-based metal film for filling is polished and removed, and the step of a second polishing wherein mainly a barrier metal film is polished and removed (for example, in Japanese Patent Application Laid-open No. 189296/2001).

What is required in the step of the first polishing is that the thick metal film for filling is polished and removed efficiently therein, and the presence of the dishing thereafter is well suppressed. Meanwhile, what is required in the step of the second polishing is that, together with some metal for filling that may remain after the step of the first polishing, the barrier metal film is polished efficiently, using the insulating film as a stopper, so that the polished face may be well planarized.

In such a two-steps polishing method, a CMP slurry having rather a strong mechanical effect than a chemical one is generally employed, in the step of the second polishing wherein mainly a barrier metal film is polished and removed, because the hardness of the barrier metal film is higher than that of the copper-based metal film.

However, if a polishing slurry whose mechanical polishing effect is strong enough to attain a satisfactory polishing rate is used, the insulating film may be excessively polished or its polished face may become rough and, thus, a good electrical connection section becomes hard to be formed. On the other hand, if a polishing slurry whose pH is adjusted to be on the acidic side is used to achieve a high polishing rate for the barrier metal film, its chemical polishing effect becomes stronger and the polishing rate for the copper-based metal for filling, higher, which may result in the creation of dishing and poor planarity of the polished face.

As a conventional method of suppressing dishing, there has been known a method wherein, through the use of a polishing slurry containing benzotriazole or its derivative, a protective film is formed on the surface of the copper film to prevent the ionization of copper by the oxidizing agent and thereby chemical dissolution of copper is suppressed. For instance, in Japanese Patent Application Laid-open No. 83780/1996, it is described that dishing of a copper film in the step of a CMP can be prevented by adding benzotriazole or its derivative into a polishing slurry.

Nevertheless, with a conventional polishing slurry which contains a protective-film forming agent such as benzotriazole, its effect of coating the copper film through formation of the protective film alone has a limitation, and its control over the polishing of the copper film is rather restricted. Especially in the step of the second polishing of the aforementioned two-steps polishing method, the polishing rate for the copper film must be lowered much further to improve the planarity of the polished face.

SUMMARY OF THE INVENTION

In light of the above problems, an object of the present invention is to provide a chemical mechanical polishing slurry which can polish and remove a barrier metal film at a satisfactory polishing rate and, at the same time, can keep a polishing rate for a copper-based metal film for filling low and, consequently, can reduce the occurrence of dishing with effect.

The present invention relates to a slurry for chemical mechanical polishing, which comprises a silica polishing material, an oxidizing agent, a benzotriazole-based compound, a diketone and water.

The present invention can polish and remove a barrier metal film at a satisfactory polishing rate and, at the same time, can keep a polishing rate for a copper-based metal film for filling low and, consequently, can reduce the occurrence of dishing with effect.

DETAILED DESCRIPTION OF THE INVENTION

The preferred embodiments of the present invention are described below.

A CMP slurry of the present invention contains a silica polishing material (polishing grains), an oxidizing agent, a benzotriazole-based compound, a diketone and water.

For a polishing material in the present invention, a silica polishing material such as colloidal silica or fumed silica is utilized, viewed from the points of the control over the polishing of the copper-based metal film, the reduction of scratches on the polished face and the dispersion stability of the slurry, and, among them, colloidal silica is particularly preferable.

In respects of the polishing rate, the polishing accuracy, the dispersion stability, the surface roughness of the polished face and the like, the average particle size of the silica polishing material, measured by the light scattering diffraction method, is preferably not less than 5 nm, more preferably not less than 10 nm and still more preferably not less than 20 nm, but preferably not greater than 300 nm, more preferably not greater than 100 nm and still more preferably not greater than 80 nm.

A content of the silica polishing material to the total amount of the polishing slurry in the polishing slurry is appropriately set within a range of 0.1 to 50 wt %, taking the polishing efficiency, the polishing accuracy and the like into consideration. In particular, from the viewpoints of the polishing rate, the dispersion stability, the surface roughness of the polished face and the like, it is set preferably not less than 0.5 wt % and more preferably not less than 1 wt %, but preferably not greater than 10 wt % and more preferably not greater than 5 wt %.

An oxidizing agent in the present invention may be appropriately selected from well known water-soluble oxidizing agents, taking the polishing efficiency, the polishing accuracy and the like into consideration. For example, there can be given peroxides such as $H_2O_2$, $Na_2O_2$, $Ba_2O_2$ and $(C_6H_5C)_2O_2$; hypochlorous acid (HClO); perchloric acid; nitric acid; ozone water; peracetic acid; nitrobenzene and organic peroxides (ketoneperoxides, diacylperoxides, hydroperoxides, alkylperoxides, peroxyketals, alkylperesters, peroxycarbonates, water-soluble peroxides and such). Among these, hydrogen peroxide ($H_2O_2$) is preferable because it does not contain a metal component or does not generate a harmful byproduct.

A content of the oxidizing agent to the total amount of the polishing slurry in the polishing slurry of the present invention is appropriately set within a range of 0.01 to 10 wt %, taking the polishing efficiency, the polishing accuracy and the like into consideration. The content thereof is set preferably not less than 0.05 wt % and more preferably not less than 0.1 wt % to achieve a better polishing rate; but preferably not greater than 5 wt % and more preferably not greater than 3 wt % to suppress the dishing and regulate the polishing rate. When the content of the oxidizing agent is too low, the chemical effects of the polishing slurry become small so that the polishing rate obtained may become insufficient or the damage may become liable to appear on the polished face. On the other hand, when the content of the oxidizing agent is too high, its etching capability (chemical effect) against the copper-based metal increases and the dishing may become liable to occur.

In the case that hydrogen peroxide is utilized as an oxidizing agent, an excellent polishing slurry can be obtained by adding, for example, an aqueous solution of hydrogen peroxide with a concentration of 30 wt % to a concentration of 1 to 5 wt % in the slurry ($H_2O_2$ concentration: 0.3 to 1.5 wt %). When such an oxidizing agent relatively susceptible to deterioration with age as hydrogen peroxide is used, it is possible to make separate preparations of a solution containing, along with a stabilizer and the like, an oxidizing agent at a given concentration and a composition which is to produce a prescribed polishing slurry on addition of the above solution containing the oxidizing agent, and mix them together just before use.

The benzotriazole-based compound in the present invention can prevent the copper-based metal from eluting out by forming a coating film on the surface of the copper film, and thereby contribute to the suppression of excessive polishing of the copper-based metal. Moreover, if this compound is utilized together with a diketone, which is described below, the excessive polishing of the copper-based metal can be reduced even more and, thus, the dishing is suppressed still further than that when the benzotriazole-based compound is singly utilized.

Examples of such a benzotriazole-based compound, that is, benzotriazole or its derivative, include benzotriazole without substitution and substituted benzotriazoles such as 1-hydroxybenzotriazole, 4-hydroxybenzotriazole, 2,3-dicarboxybenzotriazole, 2,3-dicarboxypropylbenzotriazole, 4-carboxyl-1H-benzotriazole, 4-methoxycarbonyl-1H-benzotriazole, 4-butoxycarbonyl-1H-benzotriazole and methyl-1H-benzotriazole.

A content of the benzotriazole-based compound in the polishing slurry of the present invention is set preferably not less than 0.001 wt %, more preferably not less than 0.005 wt % and still more preferably not less than 0.01 wt %, but preferably not greater than 0.5 wt %, more preferably not greater than 0.2 wt % and still more preferably not greater than 0.1 wt %. When the content of the benzotriazole-based compound is too low, its effect of reducing the excessive polishing of the copper-based metal becomes small. On the other hand, even if the content of the benzotriazole-based compound is set higher than necessary, the reducing effect matching with that content cannot be obtained.

A diketone in the present invention can reduce the excessive polishing of the copper-based metal even more when used together with the afore-mentioned benzotriazole compound than when used singly.

Examples of such a diketone include 1,2-diketones such as diacetyl, acetylbenzoyl and benzyl; 1,3-diketones such as acetylacetone, benzoylacetone and dibenzoylmethane; 1,4-diketones such as furoylacetone, acetonylacetone and phenacylacetone and 1,5-diketones such as 2,6-heptadione. Any one of these diketones can be used singly or, alternatively, two or more types of them can be used together. Among these, at least one type of a compound selected from the group consisting of 1,2-diketones, 1,3-diketones and 1,4-diketones is preferable because it can suppress the excessive polishing of the copper-based metal more satisfactorily.

A content of the diketone in the polishing slurry of the present invention is set preferably not less than 0.001 wt %, more preferably not less than 0.005 wt % and still more preferably not less than 0.01 wt %, but preferably not greater than 5 wt %, more preferably not greater than 1 wt % and still more preferably not greater than 0.5 wt %. A content ratio of the diketone to the afore-mentioned benzotriazole-based compound (diketone/benzotriazole-based compound) is preferably not less than 0.05 and more preferably not less than 0.1, but preferably not greater than 50 and more preferably not greater than 10. When the content of the diketone is too low, its effect of reducing the excessive polishing of the copper-based metal becomes small. On the other hand, even if the content of the diketone is set higher than necessary, the reducing effect matching with that content cannot be obtained.

A pH value of the CMP slurry of the present invention is set to be preferably in a range of pH 1 to 7, more preferably in a range of pH 2 to 5 and still more preferably in a range of pH 2 to 4. By employing a CMP slurry whose pH is in such a range, it is possible to carry out the polishing wherein the excessive polishing of the copper-based metal film is well suppressed, while the polishing rate for the barrier metal is kept high.

The pH of the CMP slurry may be adjusted by any well-known method, and examples of an alkali which may be used therein include alkali metal hydroxides such as sodium hydroxide and potassium hydroxide; alkali metal carbonates such as sodium carbonate and potassium carbonate; ammonia; and amines. Among them, ammonia or an amine which contains no metal component is preferable.

The CMP slurry of the present invention may contain an acidic compound when needed. The acidic compound can enhance the oxidation effect brought about by the oxidizing agent, and besides, through the control of its content, it can facilitate the adjustment of the polishing rate for the copper-based metal as well as the pH regulation and the pH stabilization. A content of the acidic compound in the CMP slurry is set appropriately within a range of 0 to 5 wt %, preferably in a range of 0.005 to 2 wt % and more preferably in a range of 0.01 to 1 wt %. When the content of the acidic compound is too low, its addition does not produce sufficient effects. On the other hand, when its content is too high, the polishing rate for the copper-based metal film may become, in some cases, unnecessarily high.

For the acidic compound described above, any one of organic acids such as carboxylic acids and amino acids as well as various inorganic acids can be employed.

As carboxylic acids, there can be given, for instance, oxalic acid, malonic acid, tartaric acid, malic acid, glutaric acid, citric acid, maleic acid, formic acid, acetic acid, propionic acid, butyric acid, valeric acid, acrylic acid, lactic acid, succinic acid, nicotinic acid and their salts.

As amino acids, there can be given, for instance, arginine, arginine hydrochloride, arginine picrate, arginine flavianate, lysine, lysine hydrochloride, lysine dihydrochloride, lysine picrate, histidine, histidine hydrochloride, histidine dihydrochloride, glutamic acid, sodium glutaminate monohydrate, glutamine, glutathione, glycylglycine, alanine, β-alanine, γ-aminobutyric acid, ε-aminocarproic acid, aspartic acid, aspartic acid monohydrate, potassium aspartate, calcium aspartate trihydrate, tryptophan, threonine, glycine, cysteine, cysteine hydrochloride monohydrate, oxyproline, isoleucine, leucine, methionine, ornithine hydrochloride, phenylalanine, phenylglycine, proline, serine, tyrosine and valine.

As inorganic acids, there can be given, for instance, nitric acid, nitrous acid, sulfuric acid, sulfurous acid, persulfuric acid, boric acid, perboric acid, phosphoric acid, phosphorous acid, hypophosphorous acid and silicic acid.

The CMP slurry of the present invention may contain a variety of additives such as a dispersing agent, a buffer agent and a viscosity modifier, which are in wide use as common additives to the polishing slurry, provided that they do not affect adversely the properties of the slurry.

For a method of preparing the CMP polishing slurry of the present invention, an ordinary method of preparing an aqueous polishing slurry composition with free grains can be applied. Specifically, an appropriate amount of a polishing material is added to an aqueous solvent and then, if necessary, with an appropriate amount of a dispersing agent being added, a treatment of dispersion is carried out. In the step of the dispersion, for example, an ultrasonic disperser, a bead mill disperser, a kneader disperser, a ball mill disperser or the like may be used, according to the circumstances.

The CMP using a CMP slurry of the present invention may be, for example, conducted in the following way. Firstly, there is provided a substrate, wherein an insulating film is formed and a sunken section in prescribed pattern shape is formed in the insulating film and, thereon, a copper-based metal film is grown. This substrate is placed on a wafer carrier such as a spindle. With a prescribed pressure applied, the surface of this copper-based metal film in this substrate is made to contact with a polishing pad which is adhered onto a surface plate such as a rotary plate, and while supplying a polishing slurry between the substrate and the polishing pad, the wafer and the polishing pad are moved relative to each other (for instance, both of them are rotated) and thereby the wafer is polished. The polishing slurry may be supplied onto the polishing pad from a supply tube set separately or it may be supplied onto the surface of the polishing pad from the side of the surface plate. If necessary, a pad conditioner may be brought into contact with the surface of the polishing pad to condition the surface of the polishing pad.

The CMP slurry of the present invention described above can be applied with effect to a polishing treatment wherein a sunken section such as a trench or a connection hole is formed in an insulating film laid on a substrate, and by polishing, by the CMP method, a copper-based metal film which is formed over the entire surface thereof so as to fill up this sunken section with a barrier metal film lying therebetween, an electrical connection section such as a buried interconnection, a via plug, a contact is formed. As an insulating film, there can be given a silicon oxide film, a BPSG (Boro-Phospho-Silicate Glass) film, a SOG (Spin-on-Glass) film, a SiOF film, a HSQ (Hydrogen Silses-Quioxane) film, a SiOC film, a MSQ (Methyl-Silses-Quioxane) film, a polyimide film, a Parylene® film (polyparaxylylene film), a Teflon® film and an amorphous carbon film. As a barrier metal film well suited to the copper-based metal film, that is, the copper film or the copper alloy film whose main component is copper, there can be given a tantalum-based metal film made of tantalum (Ta), tantalum nitride, tantalum silicon nitride or the like.

In the afore-mentioned polishing treatment, a CMP slurry of the present invention can be applied with best effect to the step which starts with polishing of the barrier metal and, with the barrier metal other than the sunken section being polished and removed, ends in formation of an electrical connection section. For example, in the two-steps polishing method described above, the step of the second polishing is well suited for its application.

EXAMPLES

With reference to Examples, the present invention is further described in detail below.

CMP Conditions

The CMP was carried out using a polisher SH-24 made by SpeedFam Co., Ltd. The polisher was used, onto a surface plate of which a polishing pad (IC 1400, made by Rodel Nitta Company) with a diameter of 61 cm was attached. Polishing conditions were as follows; a contact pressure of the polishing pad: 27.6 kPa, a polishing area of the polishing pad: 1820 $cm^2$, a rotating speed of the surface plate: 80 rpm; a carrier rotating speed: 80 rpm; and a feeding rate of the slurry polishing agent: 100 ml/min.

As a substrate for polishing, a substrate in which a copper film or a tantalum film was grown on a Si substrate by the sputtering method was used.

Measurement of Polishing Rate

The polishing rate was calculated from the surface resistivities before and after the polishing in the following way. Four needle electrodes were aligned on the wafer with a given interval, and with a given current being applied between two outer probes, a potential difference between two inner probes was measured to determine a resistance (R'), and further a surface resistivity ($\rho s'$) was obtained by multiplying that value by a correction factor RCF (Resistivity Correction Factor). A surface resistivity ($\rho s$) for another wafer film with a known thickness (T) (nm) was also obtained. Since the surface resistivity is inversely proportional to the thickness, if a thickness for the wafer with the surface resistivity of $\rho s'$ is taken as d, an equation $$d(nm) = (\rho s \times T)/\rho s'$$

is given. Using this equation, the thickness d can be determined, and the polishing rate was then estimated by dividing the difference between film thicknesses before and after the polishing by the polishing time. For the measurements of the surface resistivity, a surface resistance detector (Four Probe Resistance Detector, Loresta-GP, made by Mitsubishi Chemical Corporation) was used.

Preparation of CMP Polishing Slurry and Results of Evaluation

A number of slurries each of which contained 2 wt % of colloidal silica (TSOL Series, made by Tama Chemicals Co., Ltd.; primary particle size: approximately 50 nm), 0.02 wt % of benzotriazole shown in Table 1 as a protective-film forming agent, 0.05 wt % of diketone shown in Table 1, 1 wt % of an aqueous solution of 30 wt % hydrogen peroxide (made by Kanto Kagaku), 0.02 wt % of oxalic acid and water were prepared. Herein, for 1,2-diketone, 1,3-diketone and 1,4-diketone in Table 1, diacetyl, acetylacetone and acetonylaceton were employed, respectively.

As Cases for Comparison, there were prepared slurries containing either a protective-film forming agent or a diketone but not both and a slurry containing a monoketone (ethylmethylketone) in place of a diketone. A slurry which contains, as a protective-film forming agent, 0.1 wt % of a triazole-based compound, instead of a benzotriazole-based compound, was also prepared.

The pH value in each slurry of Examples and Cases for Comparison was adjusted to be 3.5 with an aqueous solution of ammonia.

Using each one of slurries as prepared above, CMPs were carried out. The results of measurements of the polishing rates for copper (Cu) and tantalum (Ta) in those CMPs are listed in Table 1.

As the results in Table 1 clearly indicate, slurries (Slurry No. 1 to 4) containing both a benzotriazole-based compound and a diketone can reduce the polishing rate for copper far more than any other slurries. In the CMP with any one of these slurries, because the polishing rate for the tantalum film (barrier metal film) does not differ much, a ratio of the polishing rate of copper to that of the barrier metal film is, hereat, small. In effect, these polishing slurries successfully serve the purpose of planarizing the polished face. It is, further, shown that the slurry (No. 2) containing 1,3-diketone and benzotriazole, in particular, is highly effective.

TABLE 1

| Slurry No. | Protective-film forming agent | Diketone | Cu polishing rate (nm/min) | Ta polishing rate (nm/min) |
|---|---|---|---|---|
| 1 | Benzotriazole | 1, 2-diketone | 71 | 71 |
| 2 | Benzotriazole | 1, 3-diketone | 58 | 73 |
| 3 | Benzotriazole | 1, 4-diketone | 73 | 76 |
| 4 | Methylbenzotriazole | 1, 3-diketone | 70 | — |
| 5 | Benzotriazole | — | 90 | 75 |
| 6 | — | 1, 3-diketone | 103 | — |
| 7 | 1,2,4-1H-triazole | 1, 3-diketone | 110 | — |
| 8 | 3-aminotriazole | 1, 3-diketone | 144 | — |
| 9 | Benzotriazole | Monoketone | 90 | — |

What is claimed is:

1. A slurry for chemical mechanical polishing, which comprises a silica polishing material, an oxidizing agent, a benzotriazole-based compound, a diketone and water, and
    wherein said diketone is at least one type of a compound selected from the group consisting of 1,2-diketones, 1,3-diketones and 1,4-diketones, and
    wherein a content weight ratio of said diketone to said benzotriazole-based compound (diketone/benzotriazole-based compound) is not less than 0.05 but not greater than 50.

2. A slurry for chemical mechanical polishing according to claim 1, wherein a value of a pH is in a range of 1 to 7.

3. A slurry for chemical mechanical polishing according to claim 1, wherein said silica polishing material is colloidal silica.

4. The slurry for chemical mechanical polishing according to claim 1, wherein a content weight ratio of said diketone to said benzotriazole-based compound (diketone/benzotriazole-based compound) is not less than 0.1 but not greater than 10.

5. The slurry for chemical mechanical polishing according to claim 1, wherein the content of the silica polishing material is not less than 1 wt %.

6. The slurry for chemical mechanical polishing according to claim 1, wherein the content of the silica polishing material is not less than 1 wt % but not greater than 10 wt %.

7. The slurry for chemical mechanical polishing according to claim 1, wherein the content of the benzotriazole-based compound is not less than 0.001 wt % but not greater than 0.5 wt %.

8. The slurry for chemical mechanical polishing according to claim 1, wherein the content of the diketone is not less than 0.001 wt % but not greater than 5 wt %.

* * * * *

UNITED STATES PATENT AND TRADEMARK OFFICE
CERTIFICATE OF CORRECTION

PATENT NO. : 7,229,570 B2
APPLICATION NO. : 10/616914
DATED : June 12, 2007
INVENTOR(S) : Toshiji Taiji et al.

It is certified that error appears in the above-identified patent and that said Letters Patent is hereby corrected as shown below:

On the cover page, left column, lines 6-7, the text that reads:

"(73) Assignee: NEC Electronics Corporation (Kanagawa, JP)"

should be replaced with:

--(73) Assignee: NEC Electronics Corporation, Kanagawa (JP), and Tokyo Magnetic Printing Co., Ltd., Tokyo (JP)--

Signed and Sealed this

First Day of September, 2009

David J. Kappos
*Director of the United States Patent and Trademark Office*